United States Patent
Chen et al.

(10) Patent No.: US 7,843,440 B2
(45) Date of Patent: Nov. 30, 2010

(54) SCROLLING ELECTRONIC WHITEBOARD

(75) Inventors: Chin-Yen Chen, Hsinchu (TW);
Chia-Jui Yeh, Hsinchu (TW)

(73) Assignee: WALTOP International Corp., Hsinchu (TW)

( * ) Notice: Subject to any disclaimer, the term of this patent is extended or adjusted under 35 U.S.C. 154(b) by 835 days.

(21) Appl. No.: 11/762,064

(22) Filed: Jun. 13, 2007

(65) Prior Publication Data

US 2008/0312867 A1    Dec. 18, 2008

(51) Int. Cl.
*G06F 3/041* (2006.01)
(52) U.S. Cl. .................. 345/173; 345/175; 345/178; 178/18.07; 178/18.01
(58) Field of Classification Search .............. 345/175, 345/157, 156, 178, 179; 178/18.07, 20.02; 715/753, 763, 764; 359/296
See application file for complete search history.

(56) References Cited

U.S. PATENT DOCUMENTS

| | | | |
|---|---|---|---|
| 5,134,689 A * | 7/1992 | Murakami et al. ........... | 345/443 |
| 2004/0130776 A1 * | 7/2004 | Ho et al. ..................... | 359/296 |
| 2005/0211476 A1 * | 9/2005 | Shi ............................ | 178/18.07 |
| 2006/0101682 A1 * | 5/2006 | Shi ............................ | 40/446 |
| 2006/0277804 A1 * | 12/2006 | Delaney ..................... | 40/341 |
| 2007/0025273 A1 * | 2/2007 | Chung ........................ | 370/254 |
| 2007/0205997 A1 * | 9/2007 | Lieshout et al. ............. | 345/204 |
| 2007/0285337 A1 * | 12/2007 | Maddock .................... | 345/1.1 |
| 2008/0121349 A1 * | 5/2008 | De La Cruz ................ | 160/23.1 |

* cited by examiner

*Primary Examiner*—Amare Mengistu
*Assistant Examiner*—Premal Patel

(57) ABSTRACT

A scrolling electronic whiteboard is provided, including a thin-film antenna board, at least an electromagnetic signal transmitter, a main control board, and a scrolling mechanism cassette. The scrolling mechanism cassette is for providing the housing of the thin-film antenna board to scroll and extend by pulling. The thin-film antenna board can be entirely scrolled and housed inside the scrolling mechanism cassette. The electromagnetic signal transmitter includes a resonant circuit for transmitting an electromagnetic signal of a specific frequency to determine the length of the thin-film antenna board being pulled outside of the scrolling mechanism cassette. The main control board is for receiving the antenna loop signals of the thin-film antenna board, and the electromagnetic signals of each electromagnetic signal transmitters. Therefore, a large electronic whiteboard can vary its dimensional ratio by pulling out different length of the thin-film antenna board, which can also be entirely retracted into the scrolling mechanism cassette for easy storage and transportation.

7 Claims, 5 Drawing Sheets

SCROLLING ELECTRONIC WHITEBOARD

FIELD OF THE INVENTION

The present invention generally relates to a scrolling electronic whiteboard, for providing a variable-sized writing area electronic whiteboard and with a scrolling structure convenient for storage.

BACKGROUND OF THE INVENTION

The conventional electromagnetic electronic whiteboard has the structure of using an electromagnetic pen and a writing board. This type of digital board includes an internal antenna board of a matrix form, which is a substrate made of FR1 or FR4 fiber glass, PET, PVC, PS, or plastic thin film, covered with antenna loops in a two dimensional matrix (X axis and Y axis). The size of the drawing area of the digital board is determined by the two-dimensional antenna matrix. FIG. 1 shows a conventional two-dimensional antenna matrix. When the antenna loops are laid out on the printed circuit board (PCB), the X-axis antennas (x0-x12) and Y-axis antennas (y0-y9) will be laid out on different surfaces of the PCB, and via holes are used for crossing.

In a conventional electromagnetic whiteboard or a conventional electromagnetic writing tablet, a planar dual-board structure is used for the antenna loops. In other words, the antenna board is a rigid structure that is not bendable. Therefore, the drawing area on the board is also fixed and not adjustable. As a large electronic whiteboard may be used in a smaller working environment, the storage and transportation of the electronic whiteboard are both inconvenient and expensive.

SUMMARY OF THE INVENTION

The primary object of the present invention is to provide a scrolling electronic whiteboard, including a thin-film antenna board with a substrate made of flexible material for forming the drawing area. The user can adjust the length of the thin-film antenna board to adjust the drawing area of the electronic whiteboard.

In addition, the scrolling electronic whiteboard of the present invention can also allow the scrolling of the main control board and thin-film antenna board for easy storage. In this manner, a large electronic whiteboard can be easily stored and transported.

To achieve the above objects, a scrolling electronic whiteboard of the present invention includes a thin-film antenna board, at least an electromagnetic signal transmitter, a main control board, and a scrolling mechanism cassette.

The thin-film antenna board uses a thin-film as a substrate, and a plurality of wires are equally-spaced arranged on the substrate to form a two-dimensional matrix of antenna loops. The scrolling mechanism cassette is for providing the housing of the thin-film antenna board to scroll and extend by pulling. The thin-film antenna board can be entirely scrolled and housed inside the scrolling mechanism cassette. The electromagnetic signal transmitter includes a resonant circuit for transmitting an electromagnetic signal of a specific frequency to determine the length of the thin-film antenna board being pulled outside of the scrolling mechanism cassette. The main control board includes a signal processing and control circuit, and a microprocessor. The main control board is for receiving the antenna loop signals of the thin-film antenna board, and the electromagnetic signals of each electromagnetic signal transmitters.

The thin-film antenna board of the scrolling electronic whiteboard of the present invention can be written on without completely being pulled out. Thus, the drawing area of the thin-film antenna board is adjusted by the user, which can be either 4:3, 16:9, or even square.

The scrolling mechanism cassette further includes a scrolling device. The scrolling device can be an electrical transmission device or a mechanical transmission device including a spring strip and a latch hook. The scrolling device is the mechanism for the thin-film antenna board in extension by pulling and retraction into the scrolling mechanism cassette. In addition to being part of the drawing area, the outermost antenna loop of the thin-film antenna board can further act as a confirmation antenna loop for confirming that the entire antenna board is retracted into the scrolling mechanism cassette so that the main control board can power off the electronic whiteboard to save energy.

According to the present invention, after the electromagnetic signal transmitter transmits electromagnetic signals of a specific frequency, the main control board can scan each Y-axis antenna loop on the thin-film antenna board for signal and find the Y-axis antenna loop with a largest signal amplitude to determine the length of the thin-film antenna board being pulled outside of the scrolling mechanism cassette, which also determines the drawing area of the electronic whiteboard.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
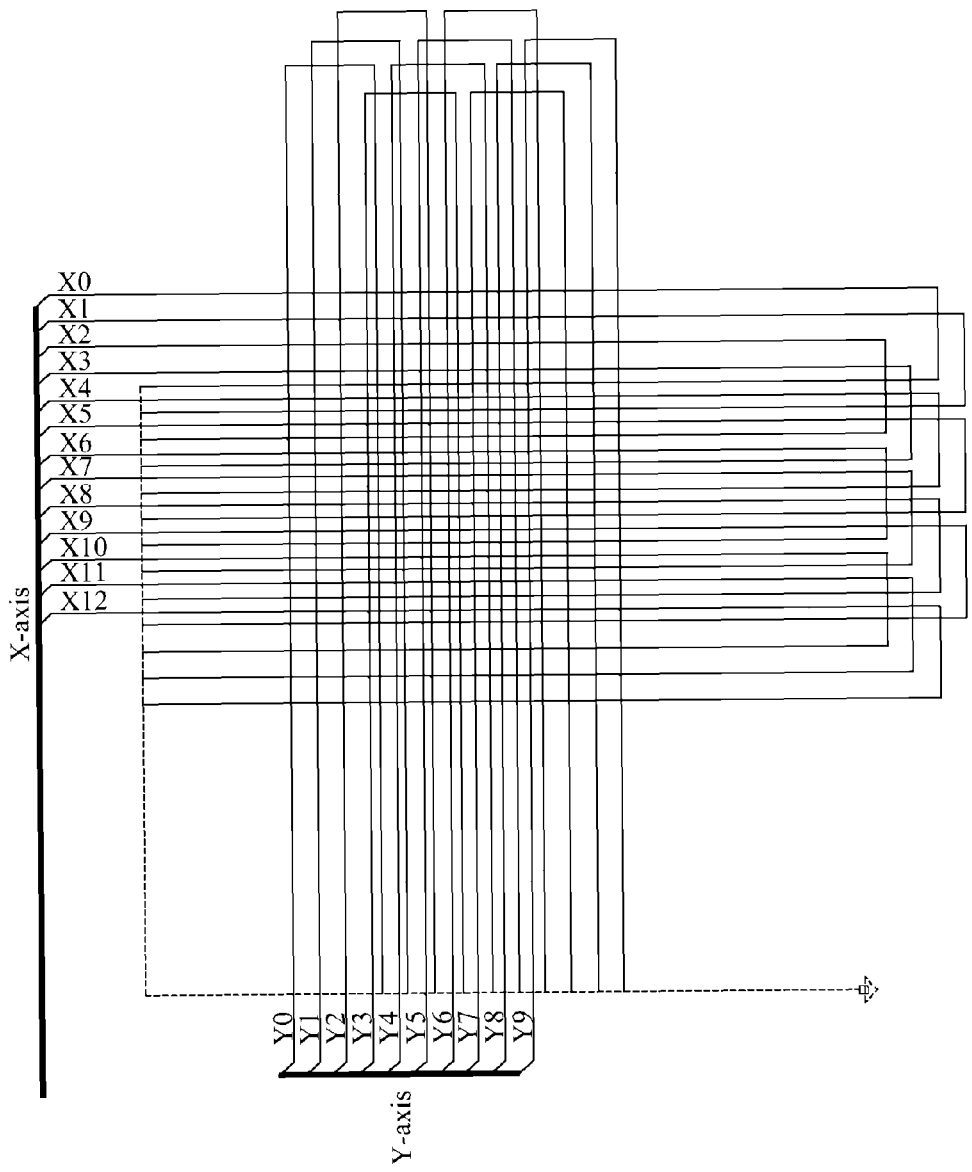
FIG. 1 shows a schematic view of a conventional two-dimensional matrix of antenna loops.
Figure 2:
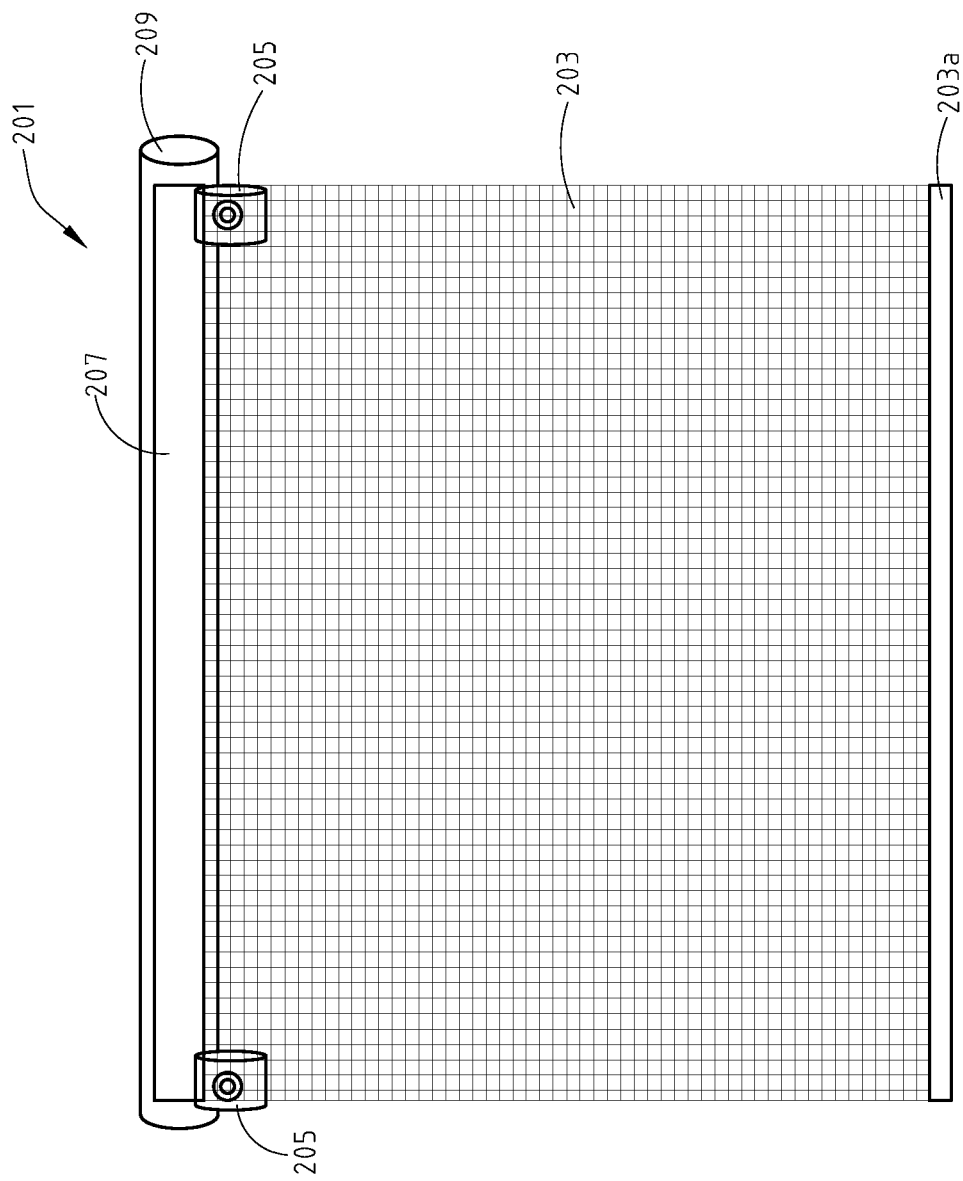
FIG. 2 shows a front view of a scrolling electronic whiteboard of the present invention.
Figure 3:
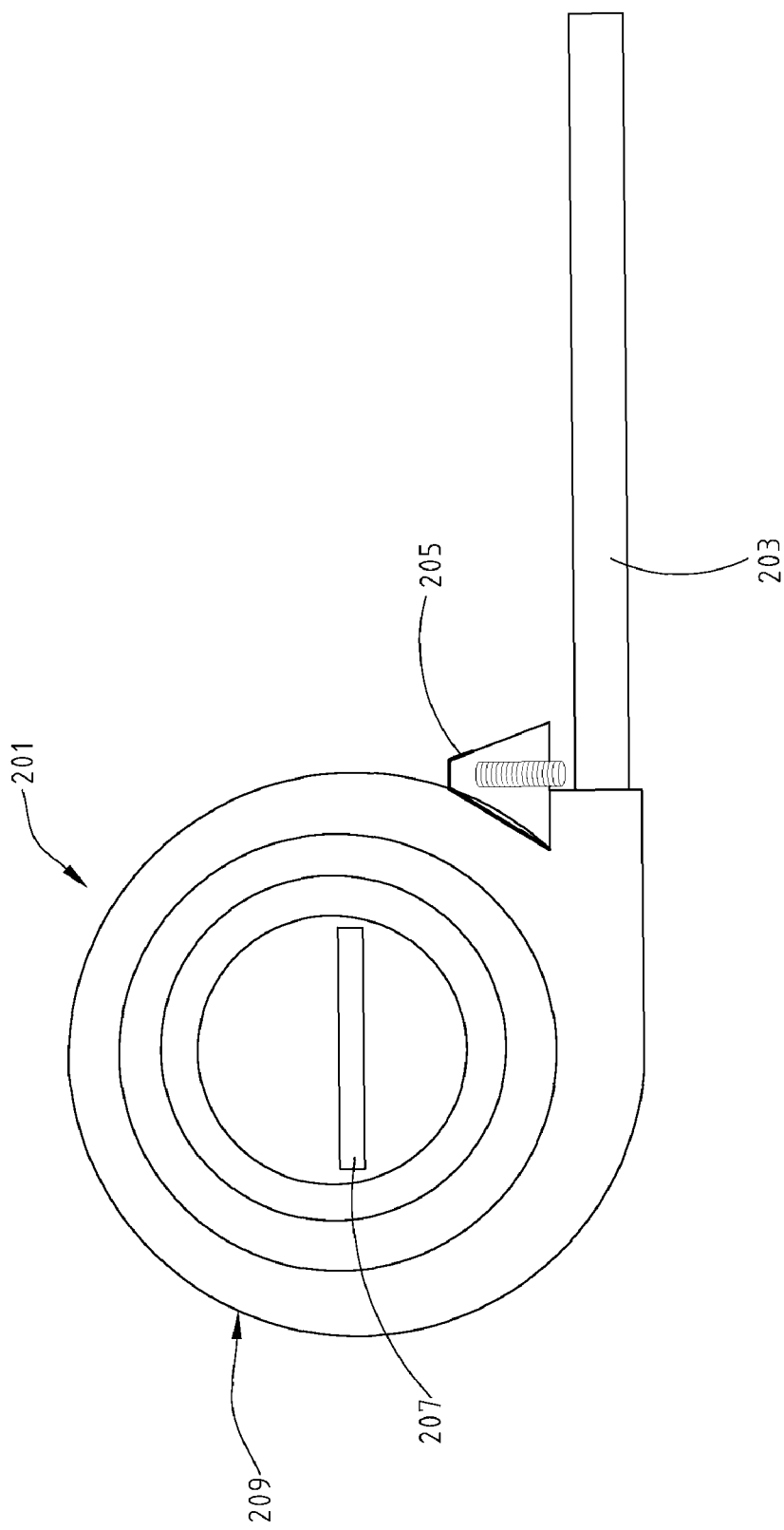
FIG. 3 shows a side view of a scrolling electronic whiteboard of the present invention.

FIG. 2 shows a front view of the scrolling electronic whiteboard of the present invention, and FIG. 3 shows a side view of the scrolling electronic whiteboard of the present invention. As shown in FIGS. 2 & 3, a scrolling electronic whiteboard 201 includes a thin-film antenna board 203, at least an electromagnetic signal transmitter 205, a main control board, and a scrolling mechanism cassette 207.

Figure 4:
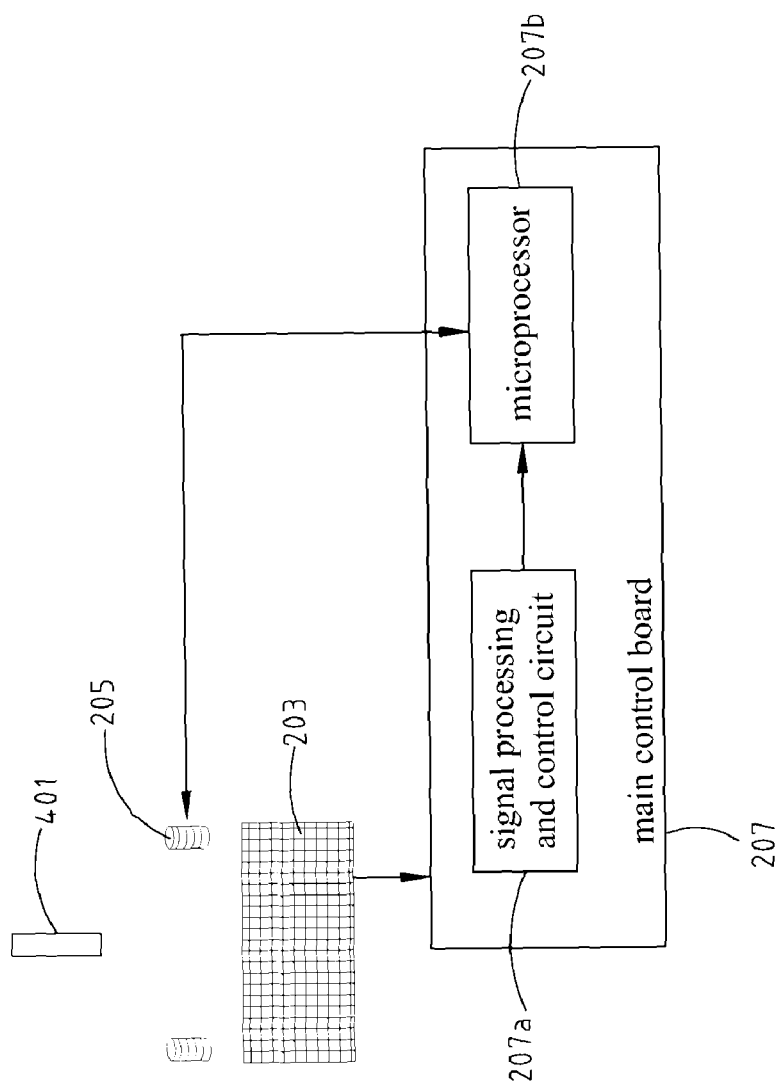
FIG. 4 shows a schematic view of the main control board receiving and processing the signals from the thin-film antenna board and the electromagnetic signal transmitter.

Thin-film antenna board 203 includes a thin-film as a substrate. A plurality of wires is equally-spaced arranged on the substrate to form a two-dimensional matrix of antenna loops. The thin-film is made of a soft and flexible material, such as plastic film, so that the thin-film is scrollable. Scrolling mechanism cassette 209 is for providing housing to thin-film antenna board 203, and thin-film antenna board 203 can be pulled out from and be retracted entirely into scrolling mechanism cassette 209. Electromagnetic signal transmitter 205 includes a resonant circuit for transmitting electromagnetic signals of a specific frequency to determine the length of thin-film antenna board 203 being extended outside scrolling mechanism cassette 209. Main control board 207 includes a signal processing and control circuit 207a and a microprocessor 207b for receiving the antenna loop signals of thin-film antenna board 203 and the signals transmitted by all the electromagnetic signal transmitters. FIG. 4 shows the Y axis antenna's loop receiving the transmitter's signal. All the Y axis antenna loop's signals will be processed and sent to microprocessor 207b. The internal resonant circuit of transmitter 205 is controlled by microprocessor 207b. Transmitter 205 starts to transmit electromagnetic wave only when the microprocessor 207b wants to know the "scrolling status" of antenna. That is to say, the transmitter 205 will be turned off when the microprocessor does not need the "scrolling status". The microprocessor 207b will turn on the Y axis coil one by one to receive the transmitter's signal. After getting all the signal amplitude of each Y axis loop, the microprocessor can know which loop is just under the transmitter. Then, the microprocessor 207b can determine the length of the thin-film antenna board being pulled out. That is, it is not necessary for the thin-film antenna board to be entirely pulled out of the scrolling mechanism cassette to be used. Therefore, the dimension of the drawing area can be 4:3, 16:9, or even square to fit various screen designs. The drawing area is completely determined by the length of thin-film antenna board 203 being pulled out.

The two-dimensional antenna loop matrix of thin-film antenna board 203 is for sensing electromagnetic field of electromagnetic pen 401. Therefore, main control board 207 is responsible for receiving the antenna loop signal of thin-film antenna board 203, and amplifying and processing the induced electromagnetic current signal, in addition to determining the length of the thin-film antenna board being pulled out according to the electromagnetic signal from electromagnetic signal transmitter 205. After the above step, the drawing area of the thin-film antenna board is ready for writing.

Without the loss of generality, main control board 207 includes a signal processing and control circuit 207a, and a microprocessor 207b. Main control board 207 can further include the following peripheral circuits and functions: analog signal amplification circuit, signal filter circuit, frequency computing circuit, RAM, flash memory, USB interface, and SD/MMC memory socket. Main control board 207 must also includes a circuit with impedance matching to receive the induced current signal from the two-dimensional antenna loops.

It is worth noting that in scrolling electronic whiteboard 201 of the present invention, thin-film antenna board 203, electromagnetic signal transmitter 205, and main control board 207 are all electrically connected by connectors, soldering, or being pressed together. The resonant circuit of electromagnetic signal transmitter 205 can be integrated into main control board 207, with only the transmitter coil and the ferrite core exposed outside of scrolling mechanism cassette 209. This can reduce the volume of electromagnetic signal transmitter 205 and reduce the manufacturing cost. In addition to being part of the drawing area, the outermost antenna loop of thin-film antenna board 203 may be a confirmation antenna loop 203a for confirming whether thin-film antenna board 203 is entirely retracted into scrolling mechanism cassette 209. If so, main control board 207 can shut off the power to save energy.

It is also worth noting that scrolling mechanism cassette 209 includes a scrolling device. The scrolling device may be an electronic transmission device or a mechanical device with a spring strip and a latch hook. The scrolling device is for providing force to retract or pull the thin-film antenna board from the scrolling mechanism cassette. The electromagnetic signal from electromagnetic pen 401 is usually within the 130-170 KHz range, and can be divided into a plurality of bands. Therefore, the electromagnetic signal from electromagnetic signal transmitter 205 can be designed to be a specific frequency between 130-170 KHz.

Figure 5:
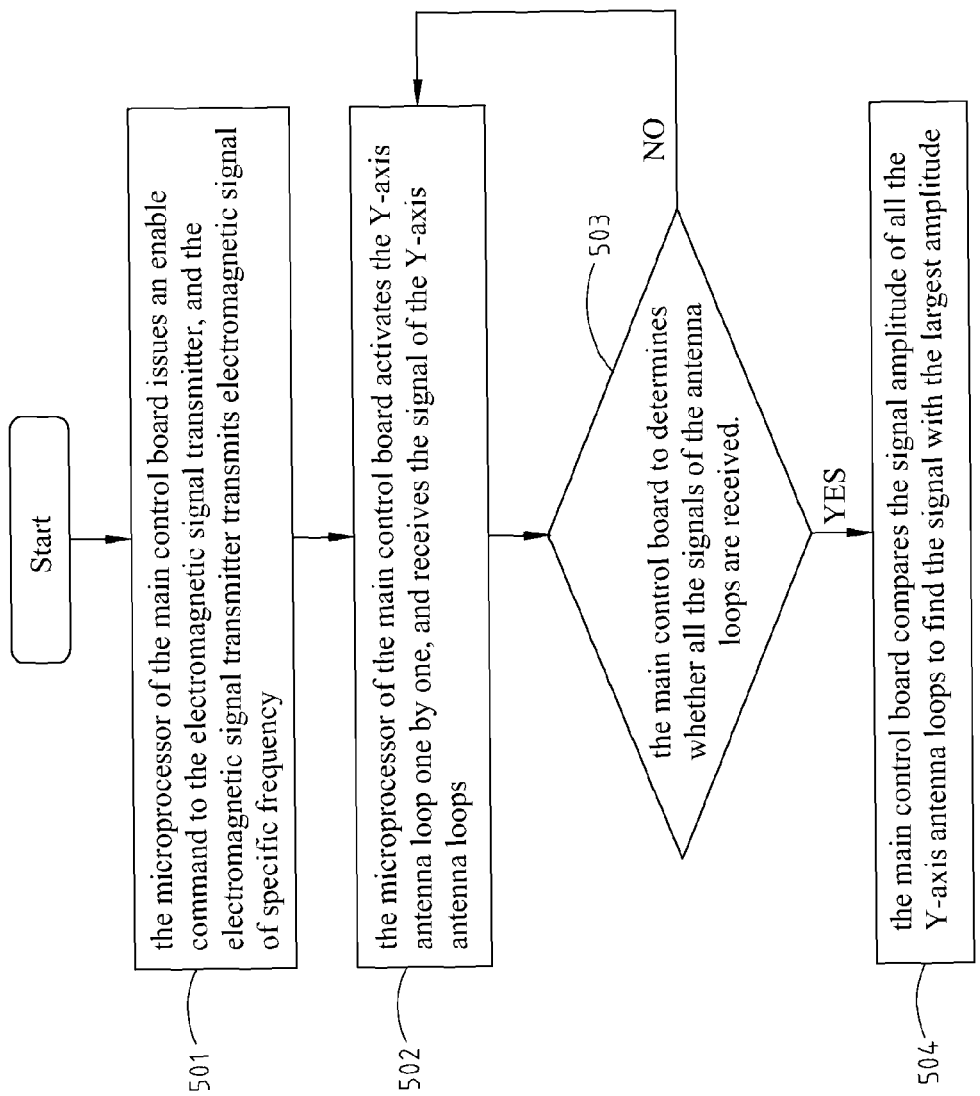
FIG. 5 shows a flowchart of the scrolling electronic whiteboard determining the length of the thin-film antenna board being pulled out.

FIG. 5 shows a flowchart of the detection of the pulled length of the thin-film antenna board of the present invention. Step 501 is for the microprocessor of the main control board to issue an enable command to the electromagnetic signal transmitter, and the electromagnetic signal transmitter to transmit electromagnetic signal of a specific frequency. Step 502 is for the microprocessor of the main control board to activate the Y-axis antenna loop one by one, and receive the signal of the Y-axis antenna loops. The main control board can use the multiplexing circuit of the signal processing and control circuit to activate the Y-axis antenna loop one by one. At any given time, only one Y-axis antenna loop can be activated. Step 503 is for the main control board to determine whether all the signals of the antenna loops are received.

In step 504, when the main control board receives the signals of all the antenna loops, the main control board compares the signal amplitude of all the Y-axis antenna loops to find the signal with the largest amplitude. As the Y-axis antenna loop directly underneath the electromagnetic signal transmitter has the largest signal amplitude, the length of the thin-film antenna board being pulled out can be determined. In step 503, if not all the signals are received, return to step 502.

After the scrolling electronic whiteboard determines the length of the antenna board being pulled out, the dimension ratio of the thin-film antenna board being pulled out can be used to adjust the drawing area of the electronic whiteboard. Also, after the length is determined, the main control board can issue a switch off command to the electromagnetic signal transmitter to reduce the interference of the electromagnetic pen signals by the electromagnetic signal transmitter.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A scrolling electronic whiteboard, comprising:
    a thin-film antenna board, with a thin-film as a substrate, a plurality of wires equally-spaced and arranged on said thin-film to form a two-dimensional matrix of antenna loops;
    a scrolling mechanism cassette, for housing said thin-film antenna board, said thin-film antenna board being able to be pulled out from or retracted into said scrolling mechanism cassette;
    at least an electromagnetic signal transmitter, with each said electromagnetic signal transmitter having a resonant circuit for transmitting an electromagnetic signal of a specific frequency; and
    a main control board, having a signal processing and control circuit and a microprocessor, for receiving antenna loop signals from said thin-film antenna board, and electromagnetic signals from each said electromagnetic signal transmitter;

wherein said main control board enables said electromagnetic signal transmitter, activates a plurality of Y-axis antenna loop in said two-dimensional matrix of antenna loops one by one for receiving a respective antenna loop signal, and a length of said thin-film antenna board being pulled out is determined by the Y-axis antenna loop that has the antenna loop signal with a largest amplitude.

2. The scrolling electronic whiteboard as claimed in claim 1, wherein said thin-film of said thin-film antenna board is made of plastic material.

3. The scrolling electronic whiteboard as claimed in claim 1, wherein an area of said thin-film antenna board being pulled out is a drawing area of said electronic whiteboard.

4. The scrolling electronic whiteboard as claimed in claim 1, wherein an outermost antenna loop of said thin-film antenna board is a confirmation antenna loop.

5. A method for detecting a length of a thin-film antenna board of a scrolling electronic whiteboard being pulled out, said method comprising the steps of:

(a) using a microprocessor of a main control board to issue an enable command to at least an electromagnetic signal transmitter, said electromagnetic signal transmitter transmitting an electromagnetic signal of a specific frequency;

(b) using said microprocessor of said main control board to activate Y-axis antenna loops of said thin-film antenna board one by one, and receiving a signal from the activated Y-axis antenna loop;

(c) determining whether the signals of all of said Y-axis antenna loops have been received, and returning to step (b) if not yet; and (d) using said main control board to compare amplitudes of the received signals from all said Y-axis antenna loops to find a Y-axis antenna loop of which the received signal has a largest signal amplitude.

6. The method as claimed in claim 5, wherein said Y-axis antenna loop with the largest signal amplitude determines the length of said thin-film antenna board being pulled out, and a dimensional ratio of said thin-film antenna board being pulled out can be used to adjust a drawing area of said scrolling electronic whiteboard.

7. The method as claimed in claim 5, wherein said main control board issues a power off command to said electromagnetic signal transmitter to prevent said electromagnetic signal transmitter from interfering with signals from an electromagnetic pen after determining the length of said thin-film antenna board being pulled out.

* * * * *